United States Patent
Aoyama (10) Patent No.: US 8,038,557 B2
(45) Date of Patent: Oct. 18, 2011

(54) POWER UNIT AND SADDLE-RIDE TYPE VEHICLE PROVIDED WITH THE POWER UNIT

(75) Inventor: Atsushi Aoyama, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 291 days.

(21) Appl. No.: 11/478,846

(22) Filed: Jun. 30, 2006

(65) Prior Publication Data

US 2007/0026982 A1    Feb. 1, 2007

(30) Foreign Application Priority Data

Jul. 4, 2005    (JP) ................................ 2005-194749

(51) Int. Cl.
*B62J 13/00*    (2006.01)
(52) U.S. Cl. .................................................. 474/144
(58) Field of Classification Search ................. 474/103, 474/144; 123/192.2
See application file for complete search history.

(56) References Cited

U.S. PATENT DOCUMENTS

| 4,494,623 A * | 1/1985 | Kurata et al. | 180/230 |
| 5,101,924 A * | 4/1992 | Yamagiwa et al. | 180/220 |
| 6,267,700 B1 * | 7/2001 | Takayama | 474/93 |
| 6,397,810 B2 * | 6/2002 | Ohyama et al. | 123/192.2 |
| 6,544,134 B2 * | 4/2003 | Ohyama et al. | 474/144 |
| 2002/0027032 A1 | 3/2002 | Tsutsumikoshi | |
| 2002/0038734 A1 | 4/2002 | Yamauchi | |
| 2005/0037876 A1 * | 2/2005 | Unno et al. | 474/12 |
| 2005/0082101 A1 * | 4/2005 | Inomori et al. | 180/219 |

FOREIGN PATENT DOCUMENTS

| JP | 04-210156 | 7/1992 |
| JP | 2003-184974 A | 7/2003 |
| JP | 2003-222054 A | 8/2003 |
| JP | 2003-328720 A | 11/2003 |
| WO | 2004/040171 A1 | 5/2004 |

OTHER PUBLICATIONS

Official Communication issued in corresponding European Patent Application No. 06013848, completed on Jan. 8, 2010.

\* cited by examiner

*Primary Examiner* — Robert Siconolfi
*Assistant Examiner* — Stephen Bowes
(74) *Attorney, Agent, or Firm* — Keating & Bennett, LLP

(57) ABSTRACT

A power unit, provided in a saddle-ride type vehicle, makes a vertical dimension of an engine body compact and achieves reduction in loss horsepower. A cylinder body is formed so that a virtual plane including a cylinder axis and being in parallel to a crank axis passes through a position displaced downward from the crank axis, At least a part of an ECVT motor (electric motor for driving) and a reciprocation gear (drive member) is arranged on a side of a virtual plane, which includes a crankcase side end of the cylinder body and is perpendicular to the cylinder axis, toward the cylinder body and above a lower surface of the cylinder body.

10 Claims, 8 Drawing Sheets

POWER UNIT AND SADDLE-RIDE TYPE VEHICLE PROVIDED WITH THE POWER UNIT

BACKGROUND OF THE INVENTION

1. Field of the Invention

The present invention relates to a unit swing type power unit, in which a transmission casing accommodating therein a continuously variable transmission mechanism and an engine body are joined integrally, and a saddle-ride type vehicle provided with the power unit.

2. Description of Related Art

Scooter type motorcycles generally have mounted thereon a unit swing type power unit, in which an engine body and a transmission casing accommodating therein a continuously variable transmission mechanism are joined integrally.

In some cases, this kind of power unit comprises a winding diameter controlling mechanism, in which an electric motor is used to variably control a belt wound diameter of a primary sheave on the basis of engine speed, vehicle speed, etc. so as to obtain an optimum transmission gear ratio corresponding to an operating state of an engine (see, for example, Patent Application No. 02-340927)

The conventional power unit described above involves a problem that a vertical dimension of an engine body becomes large depending upon an arrangement and a construction of a drive member, which varies a wound diameter of a primary sheave, and an electric motor, which drives the drive member.

Also, this conventional kind of power unit needs improvement in fuel consumption through reduction in loss horsepower.

SUMMARY OF THE INVENTION

The invention has been thought of in view of the conventional situation described above and has as its object to provide a power unit, in which an engine body can be made compact in vertical dimension and loss horsepower can be reduced, and a saddle-ride type vehicle provided with the power unit.

The invention provides a unit swing type power unit, in which a transmission casing accommodating therein a continuously variable transmission mechanism with a V-belt wound around a drive side sheave and a driven side sheave, and an engine body having a cylinder body, in which an angle formed between a virtual plane including a driven side shaft and a drive side shaft, and a cylinder axis is equal to 45 degrees or less, and a crankshaft, are joined integrally to be supported on a vehicle body frame to be able to swing, the power unit comprising a drive member, which varies a wound diameter of the drive side sheave, and an electric motor for driving, which drives the drive member, and wherein the cylinder body is formed so that a virtual plane, which includes the cylinder axis and is in parallel to the crank axis, passes through a position displaced downward from the crank axis, and at least a part of the electric motor for driving and the drive member is arranged on a side of a virtual plane, which includes a crankcase side end of the cylinder body and is perpendicular to the cylinder axis, toward the cylinder body and above a lower surface of the cylinder body.

In the power unit according to the invention, since the cylinder body is formed so that a virtual plane, which includes the cylinder axis and is in parallel to the crank axis, passes through a position displaced downward from the crank axis, the cylinder body is positioned in a low location corresponding to an amount of such displacement. Thereby, it is possible to enlarge a part mount space above the cylinder body and to make a vertical dimension of the engine body compact.

Also, the cylinder axis is arranged offset below the crank axis whereby it is possible to decrease bearing acting on the cylinder body due to reciprocating movements of a piston to achieve reduction in loss horsepower correspondingly, thus improving fuel consumption.

Furthermore, at least a part of the drive member, which varies a wound diameter of the drive side sheave, and the electric motor for driving, which drives the drive member is arranged on a side of a virtual plane, which includes a crankcase side end of the cylinder body and is perpendicular to the cylinder axis, toward the cylinder body and above a lower surface of the cylinder body, so that it is possible to arrange the drive member and the electric motor for driving making use of an empty space above the cylinder body, which is generated by having the cylinder axis arranged offset below the crank axis, thus enabling making a vertical dimension of the whole power unit compact.

Other features and advantages of the invention will be apparent from the following detailed description, taken in conjunction with the accompanying drawings which illustrate, by way of example, various features of embodiments of the invention.

DETAILED DESCRIPTION OF THE INVENTION

An embodiment of the invention will be described below with reference to the accompanying drawings.

FIGS. 1 to 8 are views illustrating a power unit according to an embodiment of the invention and a saddle-ride type vehicle provided with the power unit. The embodiment will be described with respect to the case of a power unit mounted on a scooter type motorcycle. In addition, front and rear, and left and right referred to in the embodiment mean front and rear, and left and right in a state of being seated on a seat. Also, a vertical direction referred to in the embodiment means a direction perpendicular to a road surface.

Figure 1:
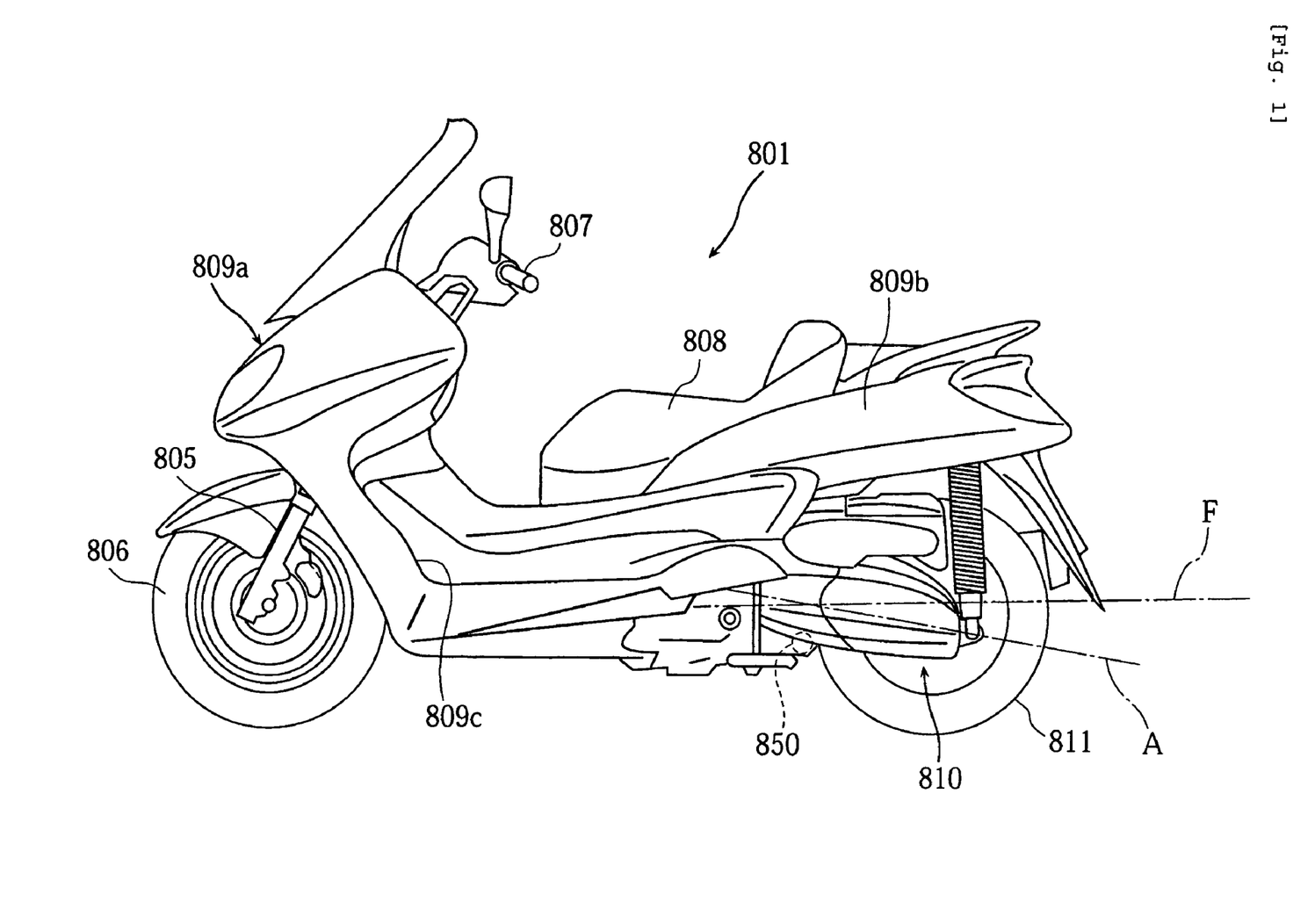
FIG. 1 is a side view showing a scooter type motorcycle provided with a power unit according to an embodiment of the invention.
Figure 2:
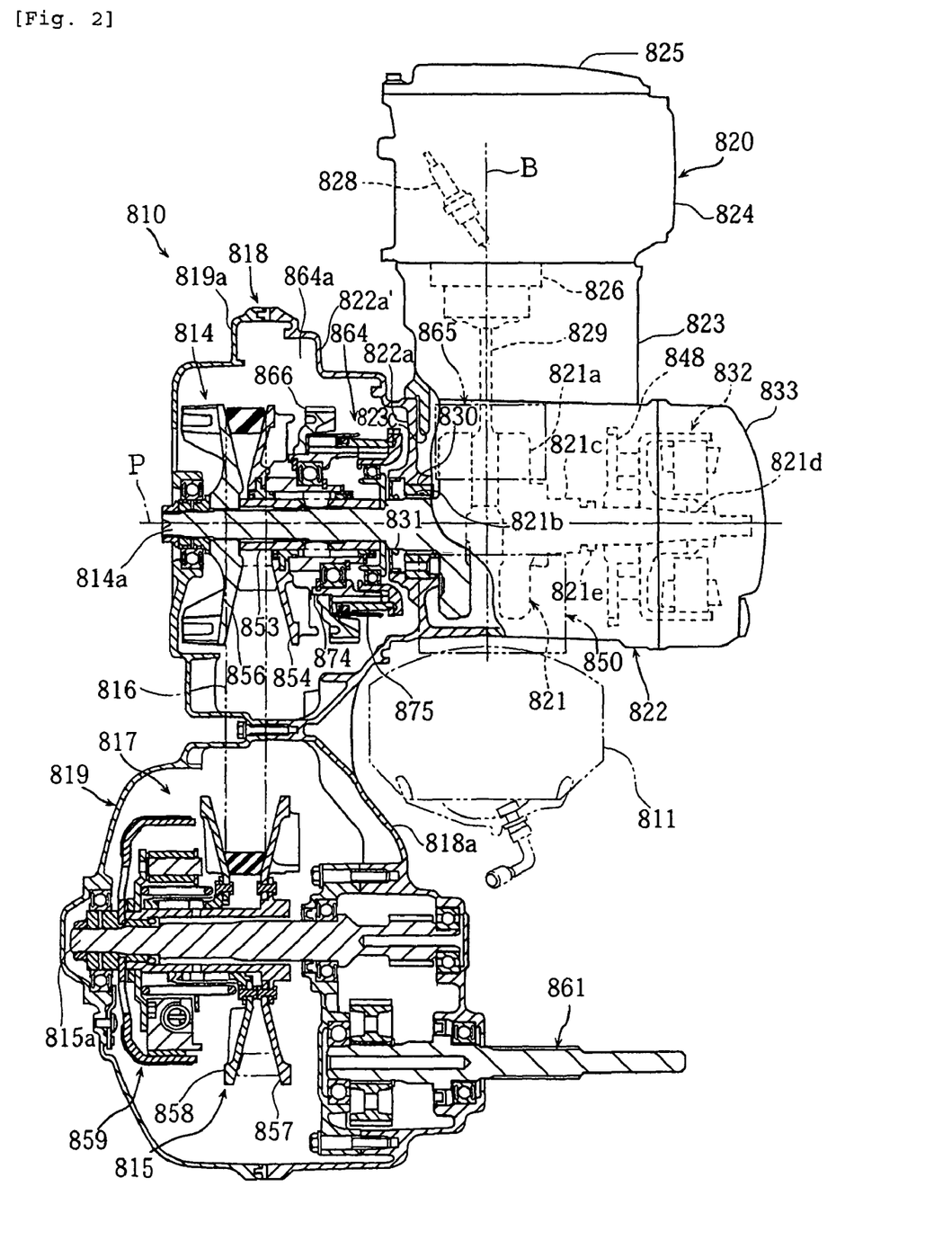
FIG. 2 is a plan view showing the power unit in partial cross section.
Figure 3:
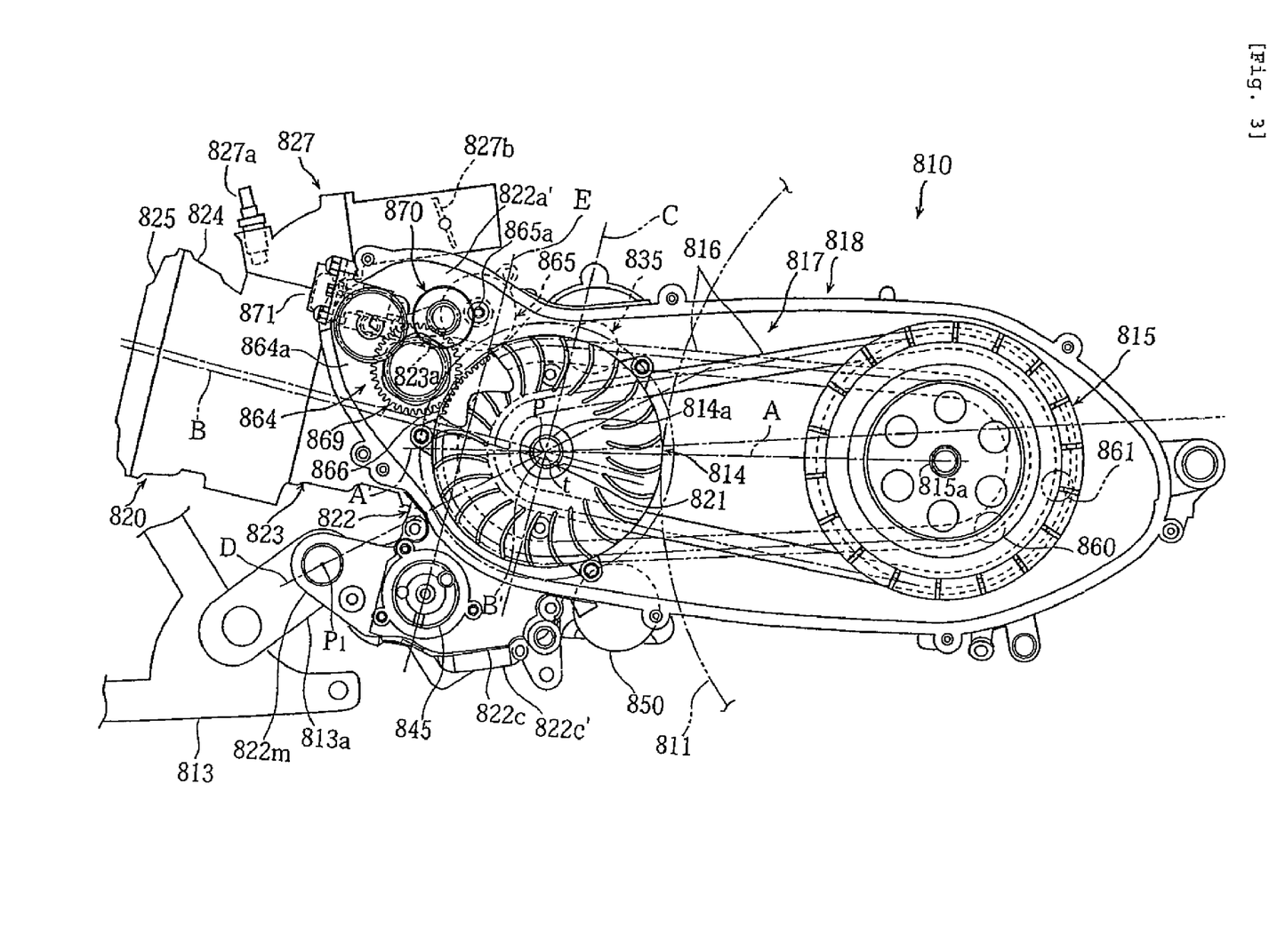
FIG. 3 is a side view showing the power unit in a state, in which a casing cover is removed.
Figure 4:
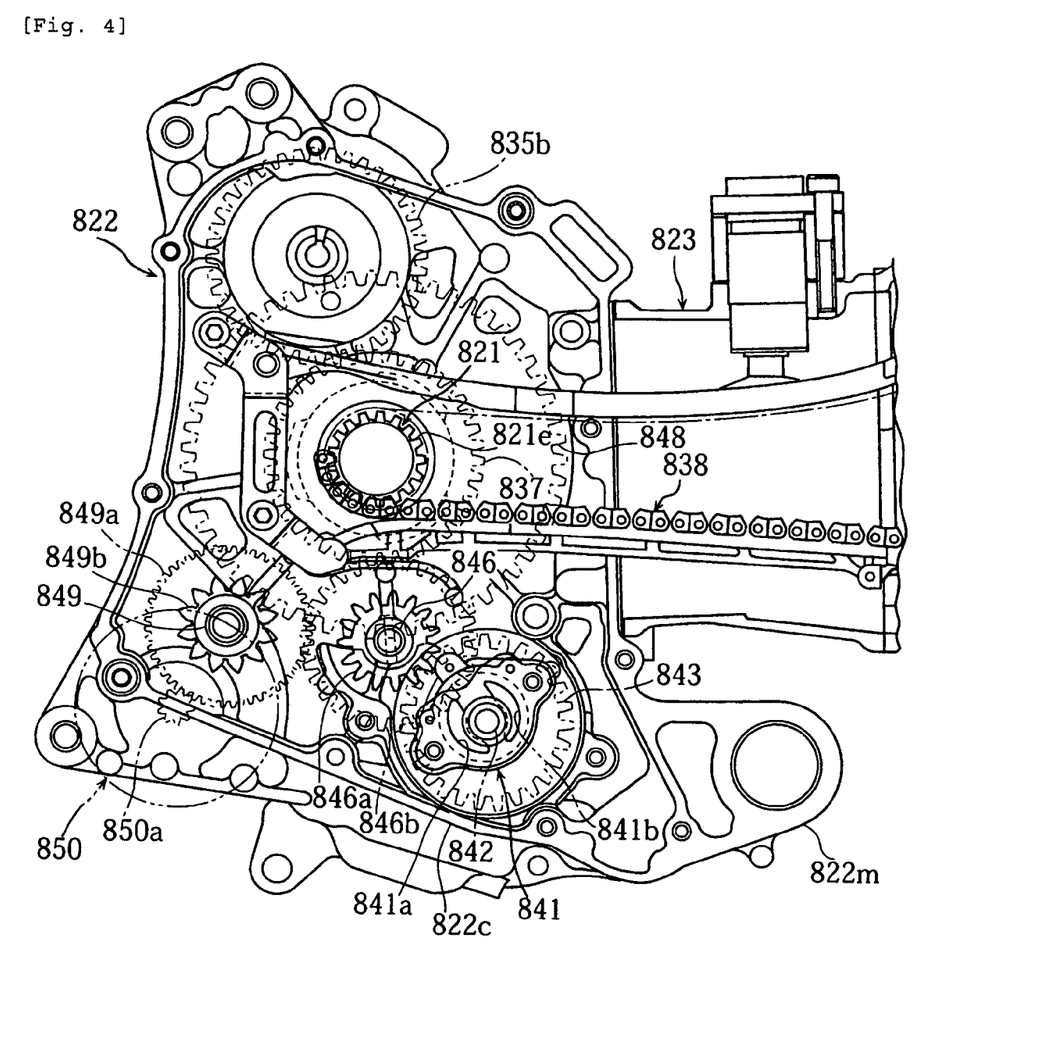
FIG. 4 is a right side view showing an engine body of the power unit.
Figure 5:
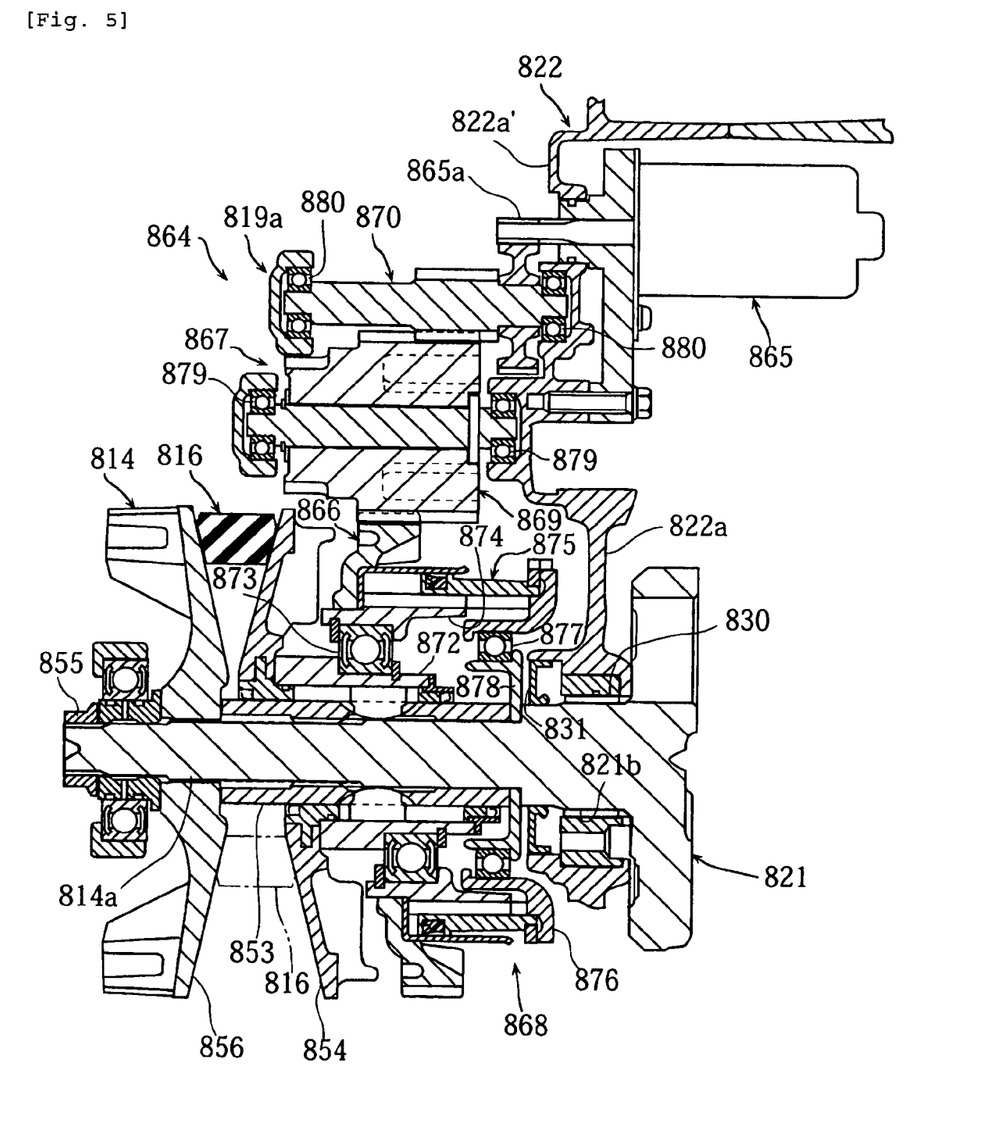
FIG. 5 is a cross sectional view showing a continuously variable transmission mechanism of the power unit.
Figure 6:
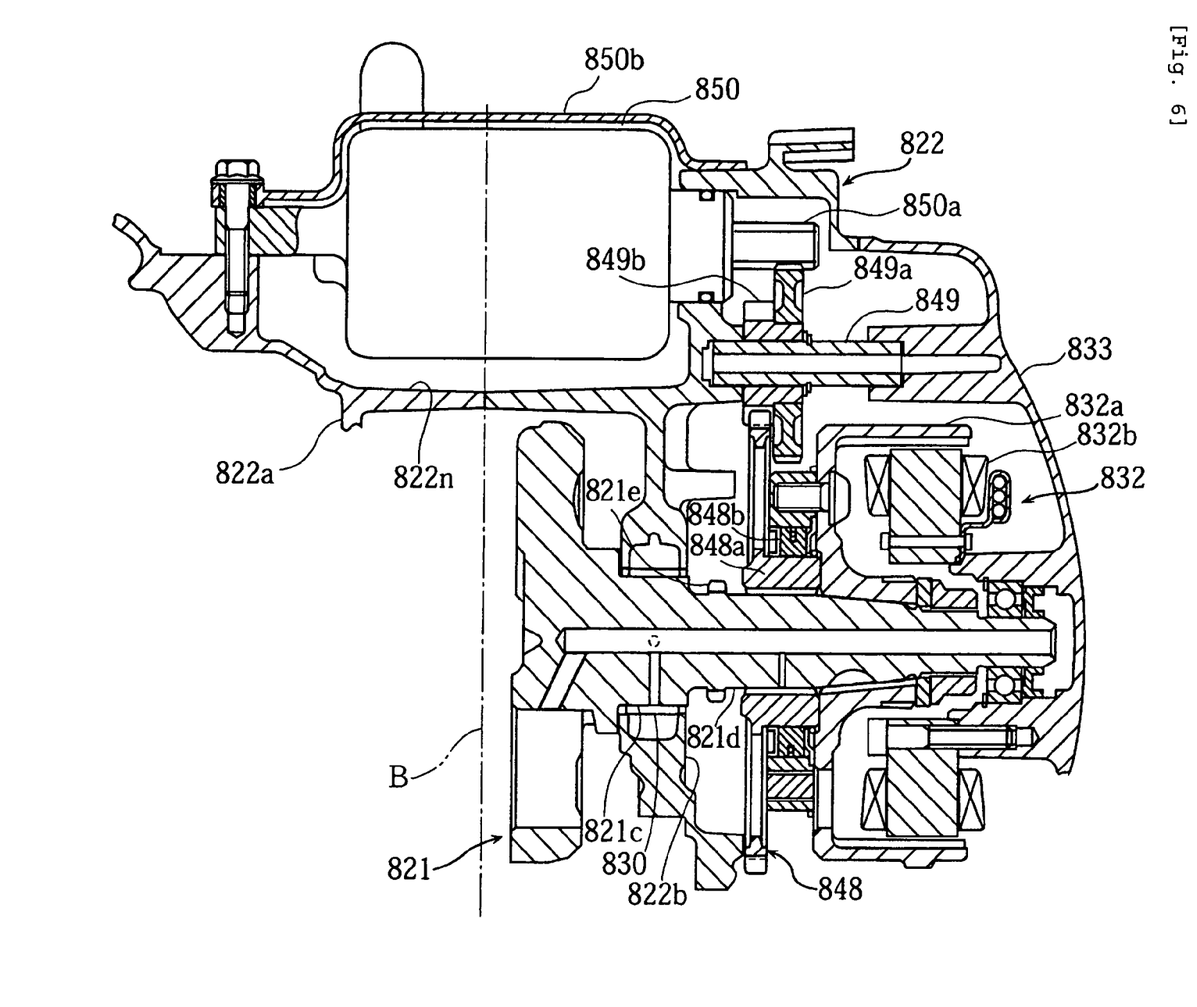
FIG. 6 is a cross sectional view showing a starter motor portion of the power unit.
Figure 7:
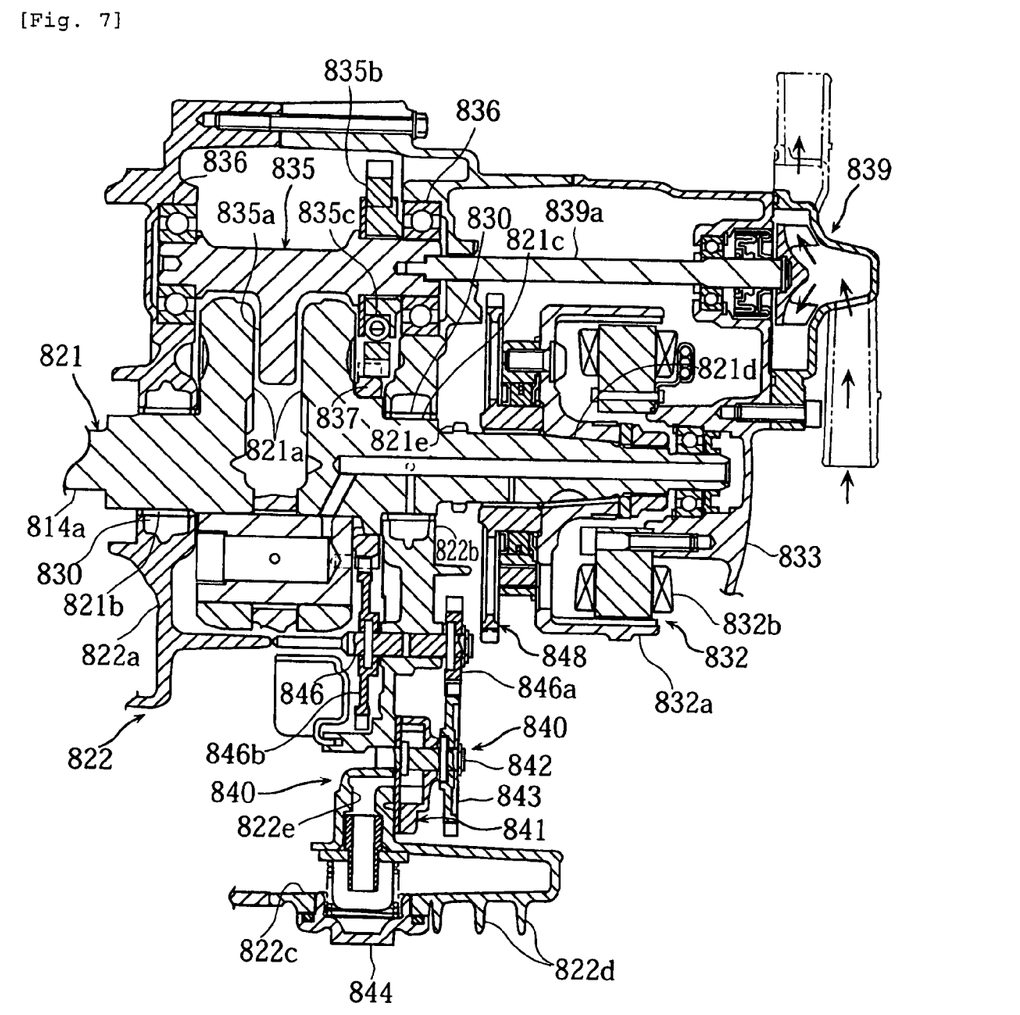
FIG. 7 is a cross sectional view showing a primary balancer and an oil pump drive unit of the power unit.
Figure 8:
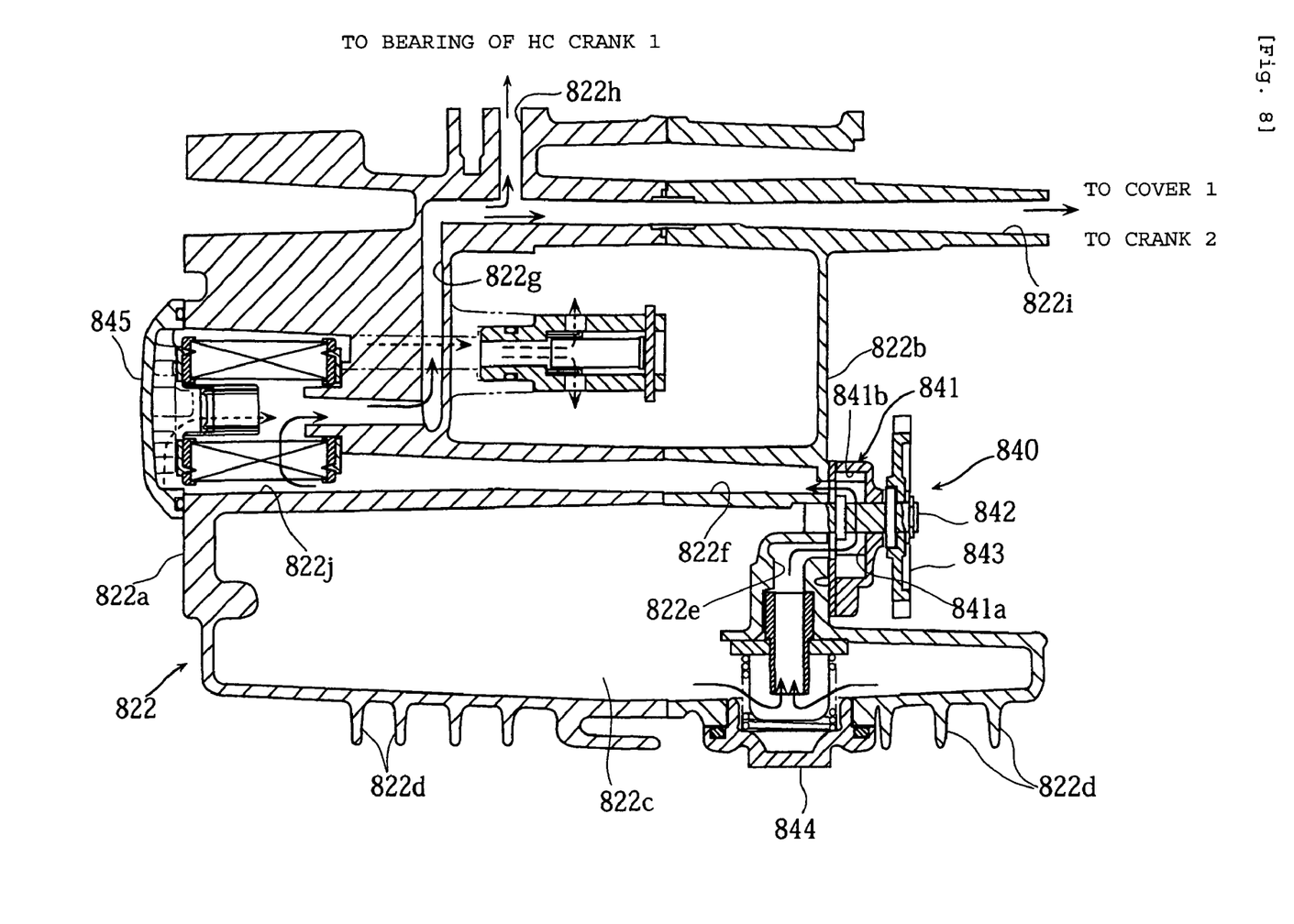
FIG. 8 is a cross sectional view showing an oil storing portion of the power unit.

In the drawings, the reference numeral 801 denotes a scooter type motorcycle having the following schematic construction. A front fork 805 is pivotally mounted on a head pipe of an underbone type vehicle body frame (not shown), the front fork 805 arranging a front wheel 806 at a lower end thereof and a steering handle 807 at an upper end thereof. Also, a saddle-ride type seat 808 for two is mounted centrally of the vehicle frame, a unit swing type power unit 810 is mounted below the seat 808 of the vehicle body frame to be able to swing vertically, and a rear wheel 811 is arranged on a rear end of the power unit 810.

A periphery of the front fork 805 is covered by a front cover 809a, and a periphery of a lower portion of the seat 808 is covered by a side cover 809b. Left and right step boards 809c, 809c are arranged between the front cover 809a and the side cover 809b.

The power unit 810 is constructed to integrally join a transmission casing 818 accommodating therein a continuously variable transmission mechanism 817, in which a V-belt 816 made of rubber or a resin is wound around a drive side sheave 814 and a driven side sheave 815, and an engine body 820 having a cylinder body, for which an angle θ formed between a virtual plane A', which includes a straight line A connecting between a driven shaft 815a of the driven side sheave 815 and a drive shaft 814a of the drive side sheave 814, and a cylinder axis (cylinder axis) B is equal to or less than 45 degrees, and about 10 degrees in the embodiment. The cylinder axis B is directed longitudinally of the vehicle.

The engine body 820 is a water-cooled type 4-cycle single cylinder engine constructed such that joined to a front mating surface of a crankcase 822, in which a crankshaft 821 is accommodated, are a cylinder block 823 with a piston 826 slidably received therein and a cylinder head 824, in which an ignition plug 828, intake and exhaust valves, and a camshaft (not shown) for drivingly opening and closing the respective valves, are arranged, and mounted to the cylinder head 824 is a head cover 825.

A pair of left and right pivots (support portions) 822m, 822m are forwardly and protrusively formed on the crankcase 822. The left and right pivots 822m are supported on an engine suspension 813 of the vehicle body frame described above through a link member 813a to be able to swing vertically.

The left and right pivots 822m are formed on a front wall portion of an oil reservoir 822c of a crankcase 822 described later to extend substantially in parallel to the cylinder axis B. Also, the left and right pivots 822m are arranged below a lower surface of the cylinder block 823 and forwardly downwardly of the crankshaft 821 as viewed in a direction along the crankshaft.

An intake pipe 827 communicated to an intake port is connected to an upper wall portion 824a of the cylinder head 824, the intake pipe 827 being bent and extended toward a vehicle rear part from the upper wall portion 824a. A fuel injection valve 827a is mounted to a downstream end of the intake pipe 827 and a throttle valve 827b is arranged on an upstream side thereof. An air cleaner (not shown) is connected to an upstream end of the intake pipe 827.

The crankshaft 821 is arranged with a crank axis P thereof directed horizontally in a vehicle width direction, and the piston 826 is connected to the crankshaft 821 through a connecting rod 829.

Left and right journal portions 821b, 821c of the crankshaft 821 are supported through bearings 830, 830 on left and right side walls 822a, 822b of the crankcase 822. A sealing member 831 is mounted between the left journal portion 821b and the left side wall 822a, whereby the crankcase 822 filled with a lubricating oil and the transmission casing 818, into which a traveling wind is introduced, are compartmented from each other.

A right drive shaft 821d projecting outward from the right side wall 822b is formed integral with the right journal portion 821c of the crankshaft 821.

An electric generator 832 is mounted at an outer end of the right drive shaft 821d, the electric generator 832 being covered by a cover 833 mounted on the right side wall 822b. The electric generator 832 comprises a rotor 832a taper-fitted onto the crankshaft 821 and a stator 832b fixed to the cover 833 in a manner to be opposed to the rotor 832a.

The left drive shaft 814a, described above, projecting into the transmission casing 818 from the left side wall 822a is formed integral with the left journal portion 821b of the crankshaft 821. The drive side sheave 814 is mounted on the drive shaft 814a.

A primary balancer 835 for suppression of vibrations caused by a primary inertial force is arranged in the crankcase 822 to be made in parallel to the crankshaft 821. Formed on the primary balancer 835 is a balancer weight 835a extending to be positioned between left and right crank arms 821a of the crankshaft 821.

The balancer 835 is supported on the left and right side walls 822a, 822b with bearings 836, 836 therebetween, and a balancer gear 835b is mounted on a right end of the balancer 835 with a damper member 835c therebetween.

A drive gear 837 meshing with the balancer gear 835b is mounted inside the right journal portion 821c of the crankshaft 821.

Also, a timing chain drive gear 821e is formed integrally outside the right journal portion 821c. The drive gear 821e is connected to the camshaft (not shown) through a timing chain 838.

A pump shaft 839a for cooling water is connected coaxially to the balancer 835. The pump shaft 839a rotationally drives a cooling water pump 839 arranged on an outer wall of the cover 833. Cooling water pressurized by the cooling water pump 839 is supplied to respective cooling water jackets (not shown) of the engine body 820.

An oil storing portion 822c is formed on a bottom of the crankcase 822. The oil storing portion 822c is expanded and formed to project downward from a lower edge of the transmission casing 818 and to tilt forwardly downward as it goes toward a front. Also, a plurality of cooling fins 822d are formed on an outer bottom surface of the oil storing portion 822c.

Arranged on the oil storing portion 822c is an oil pump 840 that supplies a lubricating oil to respective lubricated portions such as the crankshaft 821, a bearing portion of the camshaft, and slide portions, etc. The oil pump 840 comprises a housing 841 including a suction port 841a and a discharge port 841b, which are arranged outside the right side wall 822b of the crankcase 822, a pump shaft 842 journaled by the housing 841 and the right side wall 822b, and a pump gear 843 fixed to an outer end of the pump shaft 842.

An intermediate shaft 846 is journaled between the pump shaft 842 on the right side wall 822b and the crankshaft 821. The intermediate shaft 846 fixes a small gear 846a, which meshes with the pump gear 843, to an outer end thereof and a large gear 846b, which meshes with the drive gear 837, to an inner end thereof. The drive gear 837 serves as a drive member common to the balancer 835 and the oil pump 840 and is arranged in the crankcase 822.

A suction passage 822e communicated to the suction port 841a is formed on the right side wall 822b, the suction passage 822e being opened to be made close to the bottom surface of the oil storing portion 822c. In addition, the reference numeral 844 denotes a drain plug.

Also, a discharge passage 822f communicated to the discharge port 841b is formed on the right side wall 822b, the discharge passage 822f being communicated to an oil filter 845. A lubricating oil pressurized by the oil pump 840 and filtered by the oil filter 845 branches into a crankshaft path 822h and a camshaft path 822i from a supply passage 822g to be supplied to the respective lubricated portions, and then naturally drops to return to the oil storing portion 822c.

The oil filter 845 is mounted detachably in a recess 822j, which is provided in a portion of the left side wall 822a facing the oil storing portion 822c, from outside the vehicle.

The oil filter 845 and the oil pump 840 are distributed and arranged left and right with the cylinder axis B therebetween as viewed in plan view, and arranged on substantially the same axis as viewed in the direction along the crankshaft.

A starter gear 848 is mounted rotatably between the electric generator 832 on the right drive shaft 821d of the crankshaft 821 and the timing chain drive gear 821e. The rotor 832a of the electric generator 832 is fixed to a boss 848a of the starter gear 848 with a one-way clutch 848b therebetween.

A drive gear 850a of a starter motor 850 (electric motor for starting) is connected to the starter gear 848 through an idler shaft 849. The idler shaft 849 is supported bridging the right side wall 822b and the cover 833 and comprises an idler large gear 849a, which meshes with the drive gear 850a, and an idler small gear 849b, which meshes with the starter gear 848.

Rotation of the starter motor 850 is transmitted to the starter gear 848 via the idler shaft 849 and transmitted to the crankshaft 821 via the rotor 832a from the starter gear 848.

The starter motor 850 is arranged on a lower portion of a back surface of the crankcase 822 with a motor axis thereof directed in parallel to the crankshaft 821. More specifically, the starter motor 850 is arranged in an accommodation recess 822n concavely provided on a rear wall portion of the oil storing portion 822c of the crankcase 822, and covered by a motor cover 850b.

The transmission casing 818 comprises a casing body 818a formed integrally to be made contiguous to the left side wall 822a of the crankcase 822 and extend to the rear wheel 811, and a casing cover 819 mounted detachably on a left mating surface of the casing body 818a. A cooling wind introduction cover (not shown) is mounted to an outside of the casing cover 819 to introduce a traveling wind into the transmission casing 818.

The drive side sheave 814 comprises a collar member 853 spline-fitted onto the drive shaft 814a to rotate therewith, a moving sheave 854 mounted on the collar member 853 to be made axially movable and to rotate with the collar member 853, and a stationary sheave 856 mounted on the drive shaft 814a to abut against a left end surface of the collar member 853 and fixed by a lock nut 855 to be made axially immovable.

The driven side sheave 815 comprises a stationary sheave 857 mounted rotatably and axially immovably on the driven shaft 815a, which is journalled bridging the casing body 818a and the casing cover 819, a moving sheave 858 mounted on the stationary sheave 857 to be made axially movable and to rotate with the stationary sheave 857, and a centrifugal type clutch 859 interposed between the stationary sheave 857 and the driven shaft 815a. The centrifugal type clutch 859 transmits rotation of the driven side sheave 815 to the driven shaft 815a when the driven side sheave 815 is increased in rotational speed. Rotation of the driven shaft 815a is transmitted to the rear wheel 811, which is mounted on a drive shaft 861, via a main shaft 860 and the drive shaft 861, which are arranged in parallel to the driven shaft 815a.

The continuously variable transmission mechanism 817 comprises a wound diameter varying mechanism 864 that varies a belt wound diameter of the drive side sheave 814 on the basis of engine speed, vehicle speed, etc., the wound diameter varying mechanism 864 being arranged in a wound diameter control chamber 864a expanded and formed obliquely upward at a front end of the transmission casing 818.

The wound diameter varying mechanism 864 is constructed to transmit rotation of an ECVT motor (electric motor for driving) 865 to a reciprocation gear 866, which serves as a gear train and a drive member, to convert the reciprocation gear 866 into axial movements of the moving sheave 854 of the drive side sheave 814, thereby automatically and variably controlling a belt wound diameter of the drive side sheave 814 between a low position and a top position. Rotation of the ECVT motor 865 is controlled on the basis of engine speed, vehicle speed, etc. by a controller (not shown).

The wound diameter varying mechanism 864 comprises the ECVT motor 865, a rotation transmission gear portion 867, which transmits rotation of the ECVT motor 865 to the reciprocation gear 866, and an axial movement conversion portion 868, which converts rotation of the reciprocation gear 866 into axial movements of the moving sheave 854.

The ECVT motor 865 is arranged on a front portion of an upper surface of the crankcase 822 above the crankshaft 821 with a motor axis thereof directed in parallel to the crankshaft 821. Also, the ECVT motor 865 is mounted and fixed to an extension 822a' of a left wall 822a, which defines the wound diameter control chamber 864a, from inward in the vehicle width direction. A rotary gear 865a of the ECVT motor 865 extends through the extension 822a' to project into the wound diameter control chamber 864a.

As viewed from laterally of the vehicle, the ECVT motor 865 is covered by the extension 822a' and arranged between the upper surface of the crankcase 822 and the intake pipe 827.

The rotation transmission gear portion 867 comprises the reciprocation gear 866, a motor side gear 869, which meshes with the reciprocation gear 866, and a reduction gear 870, which reduces rotation of the ECVT motor 865 in speed to transmit the same to the motor side gear 869, and the rotary gear 865a of the ECVT motor 865 meshes with the reduction gear 870. Here, the reference numeral 871 denotes a rotational frequency sensor, and a state of rotation of the ECVT motor 865 and hence an axially moved position of the moving sheave 854 are detected by the rotational frequency sensor 871.

The motor side gear 869 and the reduction gear 870, respectively, are supported through bearings 879, 880 on the extension 822a' of the left wall 822a and an extension 819a of the casing cover 819.

The axial movement conversion portion 868 comprises a slide cylindrical body 872 mounted on the moving sheave 854, a moving side feed screw member 874 supported rotatably through a bearing 873 by the slide cylindrical body 872 and having the reciprocation gear 866 fixed thereto, and a stationary side feed screw member 875 meshing with the moving side feed screw member 874 and latched on the left wall 822a.

The stationary side feed screw member 875 is supported by a stationary side support member 876, which is bolted and fixed to the left wall 822a. A centering bearing 877 is arranged between the stationary side support member 876 and a bearing support member 878 fixed to the drive shaft 814a.

When an engine speed increases keeping with an accelerator opening operation, rotation of the ECVT motor 865 is controlled to present a preset belt wound diameter according to the engine speed, etc. Rotation of the rotary gear 856a of the ECVT motor 865 is transmitted to the reciprocation gear 866 from the reduction gear 870 and the motor side gear 869. When the reciprocation gear 866 rotates, the moving side feed screw member 874 together with the reciprocation gear 866 axially moves a distance corresponding to an amount of rotation of the ECVT motor 865. In keeping with this, the moving sheave 854 moves a predetermined amount toward a top side, so that the drive side sheave 814 attains the set belt wound diameter.

The power unit 810 is constructed so that a center line of the rear wheel 811 in the vehicle width direction is made consistent with a cylinder axis B and mounted so as to be made consistent with a center line of a vehicle body frame 801.

The cylinder block 823, the cylinder head 824, and the head cover 825 of the power unit 810 are arranged offset as viewed in the direction along the crankshaft so that a virtual plane B' including the cylinder axis B and being in parallel to the crank axis P passes through a position displaced t, specifically, around 5 to 7 mm, downward from the crank axis P.

A part of the reciprocation gear 866, which varies a wound diameter of the drive side sheave 814, and a major part of the ECVT motor 865, which drives the reciprocation gear 866, are arranged on a side of a virtual plane E, which includes a crankcase side end 823c of the cylinder block 823 and is perpendicular to the cylinder axis B, toward the cylinder block 823 and above the lower surface of the cylinder block 823 as viewed vertically. In other words, the wound diameter varying mechanism 864 and the ECVT motor 865 are arranged above the cylinder axis B.

Also, the ECVT motor 865 is arranged above an upper surface 823a of the cylinder block 823. More specifically, the ECVT motor 865 is arranged in a recess 822p formed on a cylinder block mating surface portion of the crankcase 822 and covered by the extension 822a' of the crankcase 822.

The reciprocation gear 866 is arranged to be positioned on the right of the cylinder block 823.

The primary balancer 835 is arranged on an opposite side of a virtual plane C, which includes the crank axis P and is perpendicular to the cylinder axis B, to the cylinder block 823 and above the crankshaft 821 as viewed in the direction along the crankshaft.

An axis of rotation of the drive gear 850a of the starter motor 850 is arranged on an opposite side of the virtual plane C, which includes the crank axis P and is perpendicular to the cylinder axis B, to the cylinder block 823 and below the crankshaft 821 as viewed in the direction along the crankshaft.

Also, the ECVT motor 865 and the starter motor 850, respectively, are arranged above and below a virtual plane D, which includes the crank axis P and an axis P1 of swinging of the pivots 822m, to be made substantially symmetric with respect to the virtual plane D.

The pivots (supports) 822m of the power unit 810 are arranged on a side of the virtual plane E, which includes the crankcase side end 823c of the cylinder block 823 and is perpendicular to the cylinder axis B, toward the cylinder block and below the lower surface 823b of the cylinder block 823 as viewed in the direction along the crankshaft. Further, the pivots 822m are arranged below a virtual plane B', which includes the cylinder axis B and is in parallel to the crank axis P.

According to the embodiment, since the cylinder block 823, the cylinder head 824, and the head cover 825 are arranged offset so that the virtual plane B', which includes the cylinder axis B and is in parallel to the crank axis P, passes through a position displaced t downward from the crank axis P, the cylinder block 823, etc. are positioned by t below the crank axis P. Thereby, a part mount space above the upper surface 823a of the cylinder block 823 is enlarged and makes a vertical dimension of the engine body 820 compact.

Also, the cylinder axis B is arranged offset below the crank axis P whereby it decreases bearing acting on a cylinder bore due to reciprocating movements of the piston 826 to achieve reduction in loss horsepower correspondingly, thus improving fuel consumption.

According to the embodiment, since a part of the reciprocation gear 866 and a major part of the ECVT motor 865 are arranged on a side of the virtual plane E, which includes the crankcase side end 823c of the cylinder block 823 and is perpendicular to the cylinder axis B, toward the cylinder block 823 and above the lower surface of the cylinder block 823, the wound diameter varying mechanism 864 and the ECVT motor 865 make use of an empty space above the cylinder block 823, which is generated by the offset arrangement, and a vertical dimension of the whole power unit 810 is compact.

According to the embodiment, since the ECVT motor 865 is arranged on the upper surface 823a of the cylinder block 823 and the cylinder block mating surface portion of the crankcase 822, the ECVT motor 865 makes use of an empty space above the cylinder block 823, which is generated by the offset arrangement, and oversizing of the power unit 810 caused by mounting of the wound diameter varying mechanism 864 is avoided.

According to the embodiment, since the primary balancer 835 for suppression of vibrations caused by a primary inertial force is arranged on an opposite side of the virtual plane C, which includes the crank axis P and is perpendicular to the cylinder axis B, to the cylinder block and above the crankshaft 821 as viewed in the direction along the crankshaft, the primary balancer 835 is positioned on an opposite side to the wound diameter varying mechanism 864 with the virtual plane C therebetween and weight balance in the front and the rear of the crankshaft 821 is favorable.

According to the embodiment, since the starter motor 850 is arranged on an opposite side of the virtual plane C, which includes the crank axis P and is perpendicular to the cylinder axis B, to the cylinder block 823 and below the crankshaft 821 as viewed in the direction along the crankshaft, the starter motor 850 is positioned on an opposite side to the wound diameter varying mechanism 864 with the virtual plane C therebetween and weight balance above and below the crankshaft 821 is favorable.

According to the embodiment, since the left and right pivots 822m of the power unit 810 are arranged on a side of the virtual plane E, which includes the crankcase side end 823c of the cylinder block 823 and is perpendicular to the cylinder axis B, toward the cylinder block 823 and below the lower surface 823b of the cylinder block 823 as viewed in the direction along the crankshaft, the pivots 822m serving as supports for vertical swinging of the power unit 810 can be positioned in positions close to the cylinder block 823 and stiffness, with which the power unit 810 is supported, can be improved.

Also, since the pivots 822m are arranged below the lower surface of the cylinder block 823, a part mount space above the cylinder block 823 is further enlarged.

In addition, while the embodiment has been described with respect to the engine having a forward tilting cylinder or a horizontal cylinder, of which a cylinder axis B forms 45 degrees or less to the virtual plane A', which includes the straight line A connecting between the drive shaft 814a and the driven shaft 815a, the invention is applicable to the case where the cylinder axis B forms 45 degrees or more. In this case, the cylinder block 823 is arranged offset so that the virtual plane B' including the cylinder axis B passes through a position displaced toward one side, for example, a front side of the crank axis P as viewed in the direction along the crankshaft. The pivots (supports) 822m are formed on a side of the virtual plane E, which includes the crankcase side end 823c of the cylinder body 823 and is perpendicular to the cylinder axis B, toward the cylinder block and on an opposite side to the crank axis P with the cylinder axis B therebetween.

Also, while the embodiment has been described with respect to a power unit of a scooter type motorcycle, the power unit of the invention is not limited to a scooter type one but is also applicable to other motorcycles. Also, "motorcycle" referred to in this application means a motorcycle including a bicycle with a prime mover (motorbicycle) and a scooter, and specifically means a vehicle capable of turning while a vehicle body inclines. Accordingly, even a three-wheeler, four-wheeler (or more) in terms of the number of tires, in which one of a front wheel and a rear wheel includes two or more wheels, can be included in "motorcycle" referred to in this application. Furthermore, the invention is not limited to a motorcycle but is applicable to other vehicles capable of making use of an effect of the invention, for example, a so-called saddle-ride type vehicle including a four-wheel buggy (ATV: All-Terrain Vehicle) and a snowmobile other than a motorcycle.

The particular embodiments of the invention described in this document should be considered illustrative, rather than restrictive. Modification to the described embodiments may be made without departing from the spirit of the invention as defined by the following claims.

The invention claimed is:

1. A power unit comprising:
   a transmission casing accommodating therein a continuously variable transmission mechanism with a V-belt wound around a drive side sheave disposed on a drive side shaft and a driven side sheave disposed on a driven side shaft;
   an engine body including a cylinder body and a crankshaft, the cylinder body inclining such that an angle formed between a virtual plane including the driven side shaft and the drive side shaft, and a cylinder axis, is equal to 45 degrees or less, and the transmission casing and the engine are integrally joined and arranged to be supported by and swing on a vehicle body frame;
   a drive member arranged to vary a wound diameter of the drive side sheave; and
   an electric drive motor arranged to drive the drive member; wherein
   the cylinder body is arranged so that a virtual plane of the cylinder body, which is coplanar with the cylinder axis and parallel to the crank axis, passes through a position displaced downward from the crank axis such that the crank axis is not coplanar with the virtual plane of the cylinder body; and
   at least a portion of the electric drive motor arranged to drive the drive member is arranged on a side of a virtual plane on which the cylinder body is located, in which the virtual plane passes through a crankcase side end of the cylinder body defined by a lower surface of the cylinder body and is perpendicular to the cylinder axis.

2. The power unit according to claim 1, wherein the at least a portion of the electric drive motor is positioned above an upper surface of the engine body.

3. The power unit according to claim 1, wherein at least a portion of the drive member is positioned laterally of the cylinder body.

4. The power unit according to claim 1, further comprising a primary balancer arranged to suppress vibrations caused by a primary inertial force, wherein the primary balancer is arranged on an opposite side of the cylinder body relative to a virtual plane, which includes the crank axis and is perpendicular to the cylinder axis, as viewed in a direction along the crankshaft.

5. The power unit according to claim 1, further comprising an electric starting motor arranged to start the power unit by rotationally driving the crankshaft, wherein an axis of rotation of the electric starting motor is arranged on an opposite side of the cylinder body relative to a virtual plane, which includes the crank axis and is perpendicular to the cylinder axis, as viewed in a direction along the crankshaft.

6. The power unit according to claim 1, wherein a support portion arranged to support the power unit to enable the same to swing relative to the vehicle body frame is arranged on a side of the cylinder body relative to a virtual plane which includes a crank shaft side end of the cylinder body and is perpendicular to the cylinder axis, and below the lower surface of the cylinder body as viewed in a direction along the crankshaft.

7. A saddle-ride vehicle comprising:
   the vehicle body frame and the power unit according to claim 1, wherein
   the power unit is mounted on the vehicle body frame with the cylinder axis directed longitudinally of the vehicle.

8. A power unit comprising:
   a transmission casing accommodating therein a continuously variable transmission mechanism with a V-belt wound around a drive side sheave and a driven side sheave; and
   an engine body including a cylinder body and a crankshaft, the transmission casing and the engine body being joined integrally and arranged to be supported by and swing on a vehicle body frame; wherein
   the cylinder body is arranged so that a virtual plane, which is coplanar with the cylinder axis and in parallel to the crank axis, passes through a position displaced toward a side of the crank axis such that the crank axis is not coplanar with the virtual plane of the cylinder body; and
   a pivot point of the power unit, which supports the power unit to enable the power unit to swing relative to the vehicle body frame about the pivot point, is provided on a crankcase or the transmission casing, and arranged on a side of a virtual plane on which the cylinder body is located, in which the virtual plane passes through a crankcase side end of the cylinder body defined by a lower surface of the cylinder body and is perpendicular to the cylinder axis, and on a lower side of the virtual plane which is coplanar with the cylinder axis and in parallel to the crank axis.

9. The power unit according to claim 8, further comprising a primary balancer arranged to suppress vibrations caused by a primary inertial force, wherein the primary balancer is arranged on an opposite side of the cylinder body relative to a virtual plane, which includes the crank axis and is perpendicular to the cylinder axis, as viewed in a direction along the crankshaft.

10. A saddle-ride vehicle comprising:
    the vehicle body frame and the power unit according to claim 8, wherein
    the power unit is mounted on the vehicle body frame with the cylinder axis directed longitudinally of the vehicle.

* * * * *